(No Model.)  2 Sheets—Sheet 1.

E. F. DYER.
APPARATUS FOR HANDLING COMMINUTED MATERIALS.

No. 604,141. Patented May 17, 1898.

Fig. I.

Witnesses
K. Lockwood-Nevins.
H. Sanderson.

Inventor
Edmund F. Dyer
By his Attorney
J. Richards (No Model.)  2 Sheets—Sheet 2.
E. F. DYER.
APPARATUS FOR HANDLING COMMINUTED MATERIALS.
No. 604,141. Patented May 17, 1898.
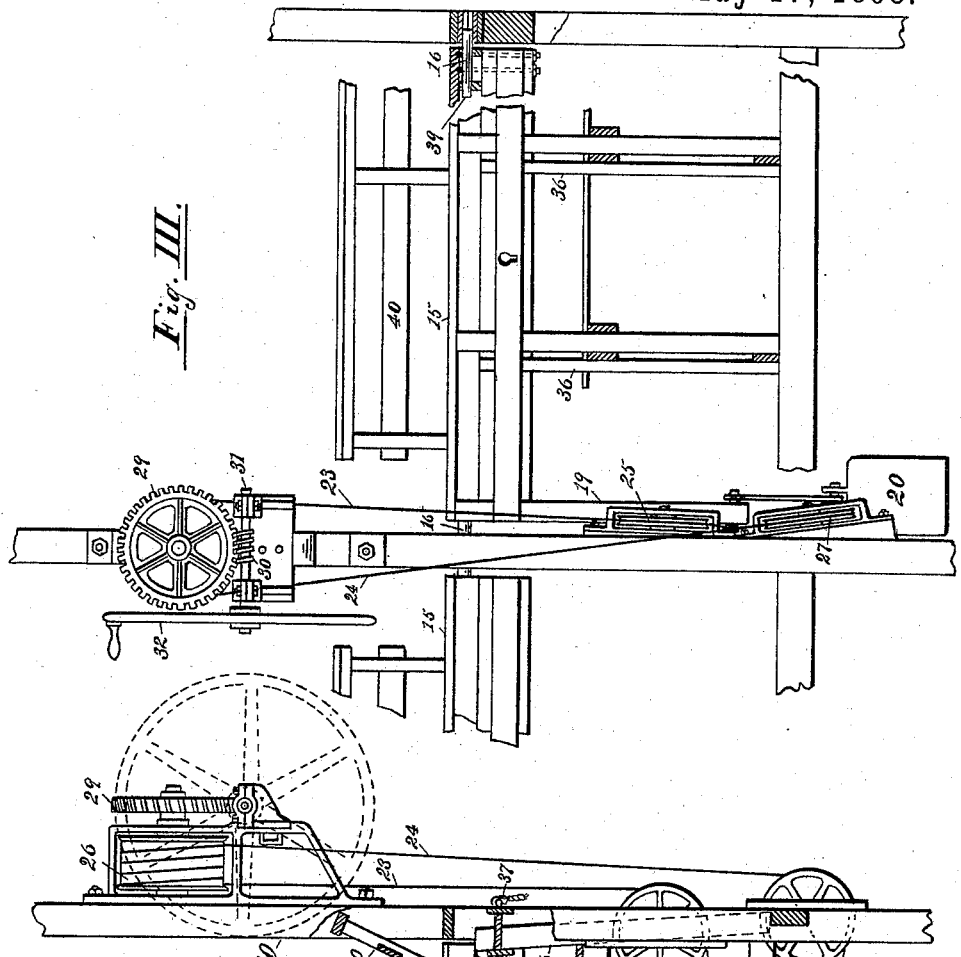
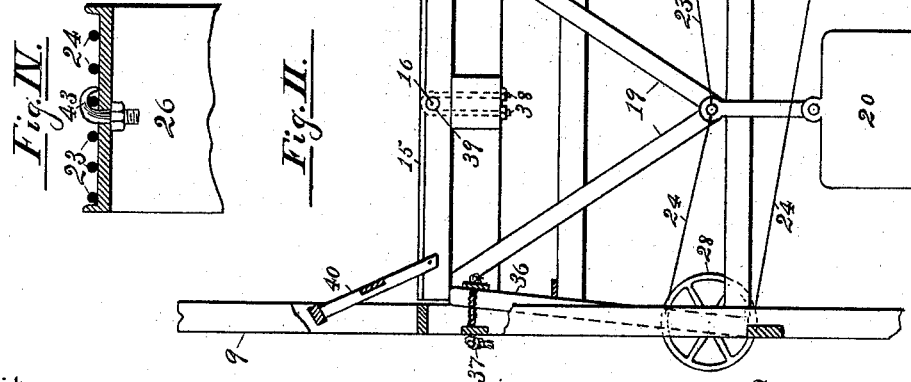
Witnesses
K. Lockwood Nevins.
H. Sanderson.
Inventor
Edward F. Dyer
By his Attorneys
J. Richards & Co.

UNITED STATES PATENT OFFICE.

EDWARD F. DYER, OF CLEVELAND, OHIO.

APPARATUS FOR HANDLING COMMINUTED MATERIALS.

SPECIFICATION forming part of Letters Patent No. 604,141, dated May 17, 1898.

Application filed November 11, 1897. Serial No. 658,146. (No model.)

*To all whom it may concern:*

Be it known that I, EDWARD F. DYER, a citizen of the United States, residing at Cleveland, county of Cuyahoga, and State of Ohio, have invented certain new and useful Improvements in Apparatus for Handling Comminuted Materials; and I hereby declare the following to be a full, clear, and exact description of the same, reference being had to the accompanying drawings, forming a part of this specification.

My invention relates to handling, storing, and conveying materials of a comminuted nature, such as coal, ore, tuberous and cereal agricultural products, and the like.

My improvements consist of a warehouse or storing-shed arranged with tilting platforms for decanting vehicles and discharging their loads and in devices therefor, bays to hold the material, and in conduits for transporting the same, as hereinafter more particularly described, and illustrated in the drawings herewith, forming a part of this specification.

The objects of my invention are to facilitate and diminish the expense of handling comminuted or mobile materials, especially such as have to be conveyed on cars or wagons to a place of storage or for use.

To these ends I construct devices and apparatus as shown in the drawings, which illustrate an application of my improvements to the handling of sugar-beets, but also adapted with slight modifications for other tuberous agricultural products or for cereals, also for coal, clay, or other substances of like nature.

Referring to the drawings, Figure I is a transverse section through a warehouse or shed provided with my improvements. Fig. II is a front view of the winding-gearing for controlling the tipples to unload cars or vehicles. Fig. III is an edge view of the same gearing at a right angle to Fig. II. Fig. IV is a detail showing the manner of attaching the ropes to the winding-drums by which the tilting platforms are moved.

Similar numerals of reference are employed to denote like parts in the different figures of the drawings.

In the handling of substances mobile enough to flow at an angle of thirty degrees or so the process is rapid when the material is raised by inclined ways high enough to slide by gravity to bins and distribute itself therein; but an impediment to this method of handling is in the removal of the material from the cars or vehicles in which it has to be first transported, and it is to this latter object that my invention is especially directed.

The warehouse shown in section in Fig. I is one arranged for sugar-beets which can be sluiced away from the bins by water and is of a single story, the material being stored at or near the ground-level. In other cases when the material has to be again handled or transported and has to descend from the bins by gravity another story would be required, so cars or vehicles could pass under the bins. As, however, such an arrangement is obvious and common in practice it does not require illustration and description here.

The present warehouse or shed is shown as adapted for the removal of the material 1 from the trough-conduits 3 by sluicing, or in other case, if required, by means of helical or chain conveyers placed in the troughs or conduits 3 in the usual manner and not requiring illustration.

The warehouse or shed shown in Fig. I is arranged for three storing-bays 4, 5, and 6 and two transporting or handling bays for wagons or cars 7 and 8, or in five divisions formed by the vertical members 9, 10, 11, and 12, connected by horizontal beams 13, the inclosing outer walls 14 forming the sides of bins 4 and 6. Between the posts or vertical members 9 and 10 and 11 and 12 I provide a strong stage or floor composed mainly of pivoted platforms 15, placed continuous or nearly continuous in the line of view or throughout the length of the building, each platform being long enough to receive a wagon or railway-car, as seen in Fig. I, leaving space for supporting cross-beams between. These platforms 15 are pivoted at 16 centrally, near the top, and are arranged to tilt with a wagon or car thereon to an angle which will decant the load, as shown at 17 in Fig. I, after which they are righted, as seen on the left in the bay 7, and form a portion of a continuous floored thoroughfare. These pivoted platforms 15 are provided at the bottom with diagonal members 19, to which are suspended counterweights 20, made as nearly as possible to balance the weight of a car 18 or wagon 21, with its load 22, on the platforms 15. By the manner of attaching these weights 20 to the triangular frame their center of gravity is about the same distance from the pivotal center 16 as is that of the load on the platforms 15, and by moving these counterweights laterally and oppositely to the load on the platforms 15 they remain in equilibrium, with the load on the latter in whatever position the platforms are placed. In this manner the platforms 15 can be turned either way to discharge the wagon 21 or car 18 into the side bins 5 and 6 or to the central bin 4 without dangerous strains and with but little force.

The discharge of the load 22 from a car or wagon on the platforms 15 destroys in part the equilibrium in respect to the counterweights 20, and these platforms have to be held against such change. To provide for this and also a convenient means of adjusting the platforms 15, I employ controlling-gearing to move, adjust, and lock these platforms 15 in all positions. This gearing consists of ropes or chains 23 and 24, attached at the apex of the diagonal members 19, one rope 23 passing around the pulley 25 and then winding on the drum 26 at the top. The other rope 24 passes around the pulleys 27 28, then upward and winds on the drum 26 oppositely to the rope 23, as shown in Figs. II and III. These ropes or chains 23 24 are fastened to the drums 26 by hook-bolts 43, as seen in Fig. IV. In this manner it will be seen that no oscillating movement of the platforms 15 can take place without corresponding rotation of the drum 26, and, conversely, this gearing can be employed to tilt the platforms either way in the following manner:

On the axle of the drum 26 is fastened a tangent wheel 29, engaged by a screw-pinion 30 on the shaft 31, operated by the hand-wheel 32, by means of which, with the interposed gearing, the platforms 15 can be slowly turned to any desired angle right or left, and when a load from a car or wagon 18 21 is discharged the counterweights 20 will cause an overbalance and righting strain to assist in bringing the platforms 15 to a level position, the tangent gearing forming a positive lock against false movement in all positions of the platforms.

The sides of the car or wagon body 33 are hinged so as to open outward, and when released will fall and form a continuation of the bottom of the car or wagon body and act as a chute for the discharged material. When the platforms 15 are swung to discharge a loaded car or wagon, these are at their upper sides attached to the platforms 15 by a link or chain 34 or secured in other manner to prevent their upsetting. There are also rails 35 at each side on the floor of the platforms 15, on which the cars 18 are moved, and in the case of wagons 21 prevent these from sliding laterally. There are also guard-fences 40 along the sides of the platforms 15 to prevent persons or animals from falling off.

When the platforms 15 are level or in their normal position, they are held at each side by the props 36, which swing inward beneath the platforms 15, forming a strong support, as seen in Figs. I and II. When the platforms 15 are to be tipped to the right or left to discharge a load, these props 36 are drawn back by lanyards 37, so as to clear the platforms 15.

The platforms 15 are pivoted by means of the U-bolts 38, that pass around the pins 39 in the ends of the platforms 15.

This description of the pivoting and controlling gearing and references marked thereon apply alike to both sides of the building and apparatus therefor, all the parts being the same on each side of the center, and it will be understood that such a structure and apparatus can consist of two storing-bays and one row of tilting platforms in the center or may consist of any number of rows of platforms and corresponding bins at the sides, as the required capacity may demand.

Having thus described the nature and objects of my invention and the manner of applying the same, what I claim as new, and desire to secure by Letters Patent, is—

1. In handling and storing apparatus, a building or shed, vertically divided into bays or compartments, a row or rows of pivoted platforms extending therethrough, means to tilt the platforms and hold the same in all positions, and counterweights suspended from a framework rigidly connected with the platform beneath it, at a point some distance below the pivot of the said platform, whereby the load is partially or wholly counterbalanced in all positions, substantially as specified.

2. A row of elevated pivoted platforms, means for tilting the same in either direction and holding them at any angle of inclination, a framework rigidly connected with each platform on the under side thereof, and a counterweight attached to said framework at such point beneath the pivot of the platform that the centers of gravity of the load and counterweight shall be approximately equidistant from the said pivot, whereby the load is partially or wholly counterbalanced in all positions, substantially as specified.

3. A row of elevated pivoted platforms, winding-gear for tilting the same in either direction, means for holding them at any angle of inclination, adjustable shores for sustaining each platform with its load in a level position, a framework rigidly connected with each platform on the under side thereof, and a counterweight attached to said framework at such point beneath the platform that the centers of gravity of the load and counterweight shall be approximately in equilibrium, whereby the load is partially or wholly counterbalanced in all positions, substantially as specified.

4. A row of elevated pivoted platforms, rails on the same for carriages to move thereon, means for tilting said platforms in either direction and holding them at any angle of inclination, a framework rigidly connected with each platform, on the under side thereof, and a counterweight attached to said framework at such point beneath the said platform that the centers of gravity of the load and counterweight shall be approximately in equilibrium, whereby the load is partially or wholly counterbalanced in all positions, substantially as specified.

5. In handling and storing apparatus, a building or shed provided with elevated ways on which cars or wagons are moved, in these ways tilting platforms provided with counterweights, ropes or chains to move or tilt the platforms right or left, the ropes or chains wound oppositely on drums moved by worm or tangent gearing that will lock and hold the gearing and platforms in any position, substantially as described.

6. In handling and storing apparatus, a building or shed provided with bins for storing, and elevated passages for cars or wagons, said passages having tilting platforms adapted to decant loads from the cars or wagons, counterweights to compensate loads on the platforms when in an angular position, ropes or chains to move the platforms, attached to a rigid frame at an approximately equal distance, with the load, from the pivot on which the platforms turn, passing around pulleys to the right and left and wound on a drum moved by tangent gearing, all operating in the manner substantially as specified.

In testimony whereof I have hereunto affixed my signature in the presence of two witnesses.

EDWARD F. DYER.

Witnesses:
WM. H. HOLABIRD,
JAMES L. KING.